B. A. BERRYMAN.
Car-Wheel and Axle.

No. 159,145.

Patented Jan. 26, 1875.

ATTEST:
Robert Burns.
Henry Tanner.

INVENTOR:
Bayard A. Berryman
By Knight Bro.
Atty.

UNITED STATES PATENT OFFICE.

BAYARD A. BERRYMAN, OF ST. LOUIS, MISSOURI, ASSIGNOR OF ONE-HALF HIS RIGHT TO GEORGE W. SHAW, OF SAME PLACE.

IMPROVEMENT IN CAR WHEELS AND AXLES.

Specification forming part of Letters Patent No. 159,145, dated January 26, 1875; application filed September 22, 1874.

*To all whom it may concern:*

Be it known that I, BAYARD A. BERRYMAN, of St. Louis, St. Louis county, Missouri, have invented a certain new and useful Improvement in Car Wheels and Axles, of which the following is a specification:

In this invention the axle has the usual vertical movement in the pedestal that takes place in the compression of the springs, but does not rotate, the wheel rotating upon the axle like that of an ordinary wagon. The hub of the wheel is made in two parts, the inner part screwing onto a neck of the main or outer part of the hub. The inner part has an interior annular flange, which fits between two stationary collars on the axle, to hold the wheel in proper position on the axle. One of said collars (the inner one) may be in one piece with the axle, but the other is secured in position upon the axle by screws after the inner part of the hub has been placed upon the axle, and before the outer part of the hub and wheel have been connected to the inner part of the hub. The axle, at its outer end, is screw-threaded for the reception of a flanged nut, against which abuts the outer end of the hub. On the outer end of the hub is a screw-cap, to form an oil-chamber, and to prevent the entrance of dust into the bearings. This oil-chamber prevents the escape of oil from the bearings. One or more closed oil-cups are supported between the spokes, and connected to the hub by a screw-threaded pipe, as shown. Between the main or central part of the hub and the inner part of the same is an annular oil-chamber, surrounding the axle-spindle to form an oil-reservoir.

Figure 1:
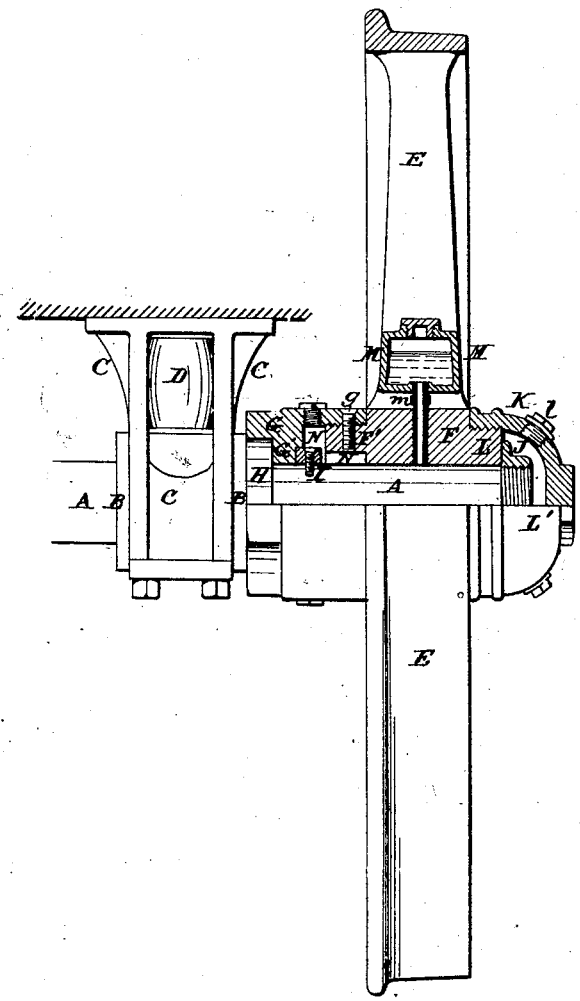
Figure 2:
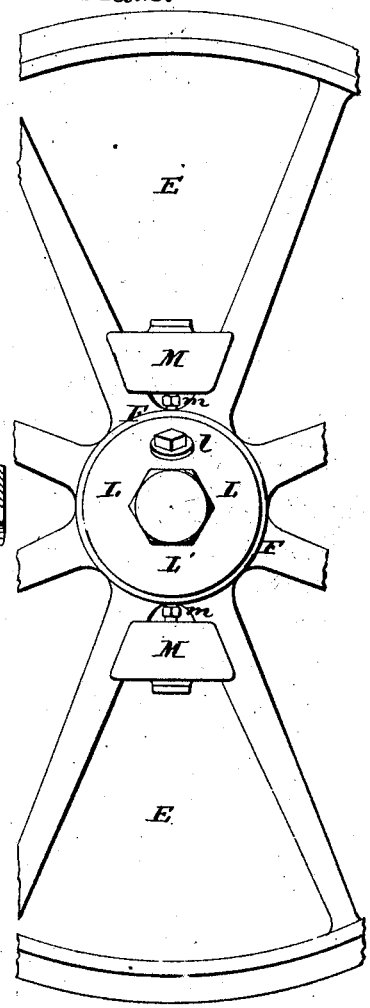

In Figure 1 the upper half is in diametric section, and the lower half in side elevation. Fig. 2 is a front view.

A is the car-axle, having square lugs B, by which it is guided in the pedestal C, and which also give bearing to the springs D. E is a car-wheel, the main part of the hub F, of which has an inwardly-projecting screw-threaded neck, F', on which screws a ring, G, forming the inner part or extension of the hub. This inner part, G, is provided with an internal annular flange, G', which is confined between the fixed collars H I of the axle A. The inner one, H, of said collars may be in one piece with the axle A. The other one, I, is removable, and is firmly secured upon the axle, by screws or other means, after the part G is placed in position on the axle, and before the main part of the hub and wheel are placed upon the axle. J is a flanged nut, screwing onto the end of the axle outside the hub F, and against which the end of the hub abuts. K is a cap, screwing onto the outer end or neck L of the hub.

The purpose of this cap is to form with the hub a close chamber, L', to receive any oil escaping from the axle-bearing, and to prevent the entrance of dust.

The chamber L' may be emptied or filled with oil through the oil-holes, closed by screw-caps *l*.

M is an oil-receptacle, placed between the spokes of the wheel, and held in place between the said spokes by the screw-pipe *m*, which passes through the hub to the axle, and constitutes the oil-duct. This screw-pipe has a right-and-left-hand screw, screwing respectively into the receptacle and the hub, so that by turning the pipe the receptacle is drawn tightly between the spokes. N is an annular chamber, which receives any surplus oil from the spindle-bearing, and furnishes it to the bearing as required.

The part G of the hub is prevented from unscrewing from the main part F by screws *g*.

I claim as my invention—

1. The combination of the axle, with fixed collar H and removable collar I, and the hub F, with inward extension G, having an interior flange, G', held between the collars H I, all substantially as set forth.

2. In combination with the hub F and the oil-reservoir M, the right and left hand threaded pipe *m*, to draw and hold the receptacle or reservoir in position between the spokes.

3. The hub F, provided with annular receptacle N, substantially as and for the purpose set forth.

4. The car-wheel E, hub F, extension G G', and oil-chambers M N, in combination with the axle A, collars H I, and cap K, substantially as set forth.

5. The removable oil-receptacle M, communicating with the car-axle by pipe provided with right and left hand screw-threads, and placed between the wheel-spokes, substantially as described.

BAYARD A. BERRYMAN.

Witnesses:
SAML. KNIGHT,
ROBERT BURNS.